(12) United States Patent
Mukherjee et al.

(10) Patent No.: US 8,029,595 B2
(45) Date of Patent: Oct. 4, 2011

(54) METHOD AND APPARATUS OF PRODUCING NANOPARTICLES USING NEBULIZED DROPLET

(75) Inventors: Rajesh Mukherjee, Irvine, CA (US); Toshitaka Nakamura, Oceanside, CA (US); Amane Mochizuki, San Diego, CA (US); Jami Hafiz, Minneapolis, MN (US); Srivathsan Ganapathysubramanian, Minneapolis, MN (US); Joachim V. R. Heberlein, North Oaks, MN (US); Steven L. Girshick, Minneapolis, MN (US)

(73) Assignees: Nitto Denko Corporation (JP); Regents of the University of Minnesota, St. Paul, MN (US)

( * ) Notice: Subject to any disclaimer, the term of this patent is extended or adjusted under 35 U.S.C. 154(b) by 528 days.

(21) Appl. No.: 12/131,844

(22) Filed: Jun. 2, 2008

(65) Prior Publication Data

US 2009/0293675 A1  Dec. 3, 2009

(51) Int. Cl.
*B22F 9/14* (2006.01)
*C01F 17/00* (2006.01)
(52) U.S. Cl. ............... 75/338; 75/346; 423/600
(58) Field of Classification Search ............... 75/336, 75/345
See application file for complete search history.

(56) References Cited

U.S. PATENT DOCUMENTS

| | | | |
|---|---|---|---|
| 4,575,609 A * | 3/1986 | Fassel et al. | 219/121.59 |
| 5,032,568 A | 7/1991 | Lau et al. | |
| 5,061,682 A | 10/1991 | Askay et al. | |
| 5,077,267 A * | 12/1991 | Engler et al. | 505/425 |
| 5,200,595 A | 4/1993 | Boulos et al. | |
| 5,369,091 A | 11/1994 | Fortunati et al. | |
| 5,401,484 A | 3/1995 | Wurmbauer et al. | |
| 5,447,708 A | 9/1995 | Helble et al. | |
| 5,560,844 A | 10/1996 | Boulos et al. | |
| 5,599,511 A | 2/1997 | Helble et al. | |
| 5,609,921 A | 3/1997 | Gitzhofer et al. | |
| 5,625,256 A | 4/1997 | Tiedt et al. | |
| 5,644,193 A | 7/1997 | Matsuda et al. | |
| 5,989,648 A * | 11/1999 | Phillips | 427/456 |
| 6,180,029 B1 | 1/2001 | Hampden-Smith et al. | |
| 6,482,387 B1 | 11/2002 | Gulgun et al. | |

(Continued)

FOREIGN PATENT DOCUMENTS

JP  4119914 A  4/1992

OTHER PUBLICATIONS

Bouyer, E., Gitzhofer, F., and Boulos, M. I., *Suspension plasma spraying for hydroxyapatite powder preparation by RF Plasma.* IEEE Transactions on Plasma Science 25(5): 1066-1072 (1997).

(Continued)

*Primary Examiner* — George Wyszomierski
(74) *Attorney, Agent, or Firm* — Knobbe, Martens, Olson & Bear, LLP

(57) ABSTRACT

Methods of generating nanoparticles are described that comprises feeding nebulized droplets into a radio frequency plasma torch to generate nanoparticles, wherein the majority of the nanoparticles generated have a diameter of less than about 50 nm. These methods are useful for synthesizing nanoparticles of metals, semiconductors, ceramics or any other material class where the precursors are either in liquid form or can be dissolved or suspended in a suitable liquid. Methods of feeding nebulized droplets and central gas into a radio frequency plasma torch and apparatus for generating nanoparticles are also described.

18 Claims, 7 Drawing Sheets

U.S. PATENT DOCUMENTS

| | | |
|---|---|---|
| 6,601,776 B1 | 8/2003 | Oljaca et al. |
| 6,656,588 B1 | 12/2003 | Laine et al. |
| 6,884,514 B2 | 4/2005 | Simpson et al. |
| 6,994,837 B2 | 2/2006 | Boulos et al. |
| 7,112,758 B2 | 9/2006 | Ma et al. |
| 7,220,398 B2 | 5/2007 | Sutorik et al. |
| 7,361,938 B2 | 4/2008 | Mueller et al. |
| 2004/0101617 A1 | 5/2004 | Devi et al. |
| 2006/0045811 A1 | 3/2006 | Sugiyama |
| 2006/0124951 A1 | 6/2006 | Sakata et al. |
| 2007/0029291 A1 | 2/2007 | Boulos et al. |
| 2008/0108496 A1 | 5/2008 | Gratson et al. |
| 2008/0187746 A1 | 8/2008 | De Graaf et al. |

OTHER PUBLICATIONS

Castillo, I. A. and Munz, R. J., *Inductively Coupled Plasma Synthesis of $CeO_2$-based Powders from Liquid Solutions for SOFC Electrolytes*. Plasma Chemistry and Plasma Processing, 25(2): 87-107 (2005).

De la Mora, J. Fernandez, et al., *Electrospray Atomization: Fundamentals and its Application in Nanoparticles Technology*. Journal of Aerosol Science, 28(1): S63 (1997).

Fauchais, P., Etchart-Salas, R., Delbos, C., Tognonvi, M., Rat, V., Coudert, J. F., and Chartier, T., *Suspension and solution plasma spraying of finely structured layers: potential application to SOFCs*. Journal of Physics D: Applied Physics, 40(8): 2394-2406 (2007).

Girshick, S. L., *Particle nucleation and growth in thermal plasmas*. Plasma Sources Science and Technology, 3: 288-394 (1994).

Hess, D. et al., *Medication Nebulizer Performance. Effects of Diluent Volume, Nebulizer Flow, and Nebulizer Brand*. American College of Chest Physicians, 110: 498-505 (1996).

Hosokawa, S., Tanaka, Y., Iwamoto, S., and Inoue, M., *Defect structure of rare earth aluminium garnets obtained by the glycothermal method*. Journal of Alloys and Compounds, (2007).

Inoue, M., Otsu, H., Kominami, H., and Inui, T., *Synthesis of Yttrium Aluminum Garnet by the Glycothermal Method*. Journal of the American Ceramic Society, 74(6): 1452-1454 (1991).

Kagawa, M., Suzuki, M., Mizoguchi, Y., Hirai, T., and Syono, Y., *Gas-phase synthesis of ultrafine particles and thin films of Y-Al-O by the spray-ICP technique*. Journal of Aerosol Science, 24(3): 349-355 (1993).

Kang, Yun Chan, et al., *GA High-Volume Spray Aerosol Generator Producing Small Droplets for Low Pressure Applications*. Journal of Aerosol Science, 26(7): 1131-1138 (1995).

Kasuya, R., Isobe, T., Kuma, H., and Katano, J., *Photoluminescence Enhancement of PEG-Modified YAG:$Ce^{3+}$ Nanocrystal Phosphor Prepared by Glycothermal Method*. Journal of Physical Chemistry B, 109: 22126-22130 (2005).

Kasuya, R., Isobe, T., and Kuma, H., *Glycothermal synthesis and photoluminescence of YAG:Ce3+ nanophosphors*. Journal of Alloys and Compounds, 408-412: 820-823 (2006).

Kumar, Rajendra, et al., *GRF Plasma Processing of Ultra-Fine Hydroxyaptite Powders*. Journal of Materials Processing Technology, 113: 456-462 (2001).

Lenggoro, et al., *GPreparation of ZnS Nanoparticles by Electrospray Pyrolysis*, Journal of Aerosol Science, 31(1): 121-136 (2000).

Leparoux, M., Schreuders, C., Shin, J. W., and Siegmann, S., *Induction Plasma Synthesis of Carbide Nano-Powders*. Advanced Engineering Materials, 7(5): 349-353 (2005).

Loffert, DT, et al., *IA Comparison of Commercial Jet Nebulizers*. American College of Chest Physicians, 106: 1788-1792 (1994).

Marchal, J., John, T., Baranwal, R., Hinklin, T., and Laine, R. M., *Yttrium Aluminum Garnet Nanopowders Produced by Liquid-Feed Flame Spray Pyrolysis (LF-FSP) of Metalloorganic Precursors*. Chemistry of Materials, 16: 822-831 (2004).

Maric, R., Oljaca, M., Vukasinovic, B., and Hunt, A. T., *Synthesis of Oxide Nanopowders in NanoSpray$^{SM}$ Diffusion Flames*. Materials & Manufacturing Processes, 19(6): 1143-1156 (2004).

May, K. R., *The collison nebulizer: Description, performance and application*. Journal of Aerosol Science, 4(3): 235-238 (1973).

McLean, John A., et al., *DA Direct Injection High-Efficiency Nebulizer for Inductively Coupled Plasma Mass Spectrometry*. Journal of Anal. Chem., 70(5): 1012-1020 (1998).

Mizoguchi, Y., Kagawa, M., Syono, Y., and Hirai, T., *Deposition of $TiO_2$ on heated substrates by the spray-inductively-coupled-plasma technique*. Journal of Materials Science Letters, 12(23): 1854-1855 (1993).

Mizoguchi, Y., et al., *Film Synthesis of $Y_3Al_5O_{12}$ and $Y_3Fe_5O_{12}$ by the Spray-Inductively Coupled Plasma Technique*. J. Am. Ceram. Soc., 84(3): 651-53 (2001).

Mueller, R., Madler, L., and Pratsinis, S. E., *Nanoparticle synthesis at high production rates by flame spray pyrolysis*. Chemical Engineering Science, 58(10): 1969-1976 (2003).

Nyman, M., Caruso, J., Hampden-Smith, M. J., and Kodas, T. T., *Comparison of Solid-State and Spray-Pyrolysis Synthesis of Yttrium Aluminate Powders*. Journal of the American Ceramic Society, 80(5): 1231-1238 (1997).

Parukuttyamma, S. D., Margolis, J., Liu, H., Parise, J. B., Grey, C. P., Sampath, S., Gouma, P., and Herman, H., eds. *Deposition and Characterization of $Y_3Al_5O_{12}$ (YAG) Films and Powders by Plasma Spray Synthesis*. MRS Fall Meeting (Symposium GG). vol. 658 MRS: Boston. pp. 6 (2000).

Parukuttyamma, S. D., Margolis, J., Liu, H., Grey, C. P., Sampath, S., Herman, H., and Parise, J. B., *Yttrium Aluminum Garnet (YAG) Films through a Precursor Plasma Spraying Technique*. Journal of the American Ceramic Society, 84(8): 1906-1908 (2001).

Ravi, B. G., Gandhi, A. S., Guo, X. Z., Margolies, J., and Sampath, S., *Liquid Precursor Plasma Spraying of Functional Materials: A Case Study for Yttrium Aluminum Garnet (YAG)*. Journal of Thermal Spray Technology, 17(1): 82-90 (2008).

Ribeiro, Anderson Schwingel et al., *Coupling of Ultrasonic Nebulization to Flame Furnce Atomic Absorption Spectrometry-New Possibilities for Trace Element Determination*. Microchemical Journal, 85(2): 341-346 (2007).

Schiller, G., Müller, M., and Gitzhofer, F., *Preparation of perovskite powders and coatings by radio frequency suspension plasma spraying*. Journal of Thermal Spray Technology, 8(3): 389-392 (1999).

Young, Harold W., et al., *Continuous Aerosol Therapy System Using a Modified Collison Nebulizer*. Journal of Clinical Microbiology, 5(2): 131-136 (1977).

\* cited by examiner

METHOD AND APPARATUS OF PRODUCING NANOPARTICLES USING NEBULIZED DROPLET

BACKGROUND

1. Field of the Invention

The present disclosure relates to a method of generating nanoparticles using a radio frequency plasma torch and a nebulizer.

2. Description of the Related Art

Over the last few decades, many different techniques have been utilized for the production of fine particles of a variety of materials. Mechanical attrition, wet chemical synthesis routes and aerosol/vapor based syntheses are the most commonly cited processes for this purpose. There are several advantages in using aerosol/vapor based processes like flame spray pyrolysis [1], combustion synthesis [2] and thermal plasma synthesis [3-8]. For example, they allow easy control of morphology and a relatively large production capacity. In addition, unique material phases can sometimes be obtained due to the non-equilibrium nature of these processes. Among aerosol/vapor phase processes, radio frequency (RF) plasma techniques (alternatively, inductively coupled or induction plasma) are especially valuable. RF plasma techniques offer various advantages such as large plasma volume, low gas velocity, and the capability for axial injection of the feedstock. Because the RF plasma techniques are inherently electrodeless, they also serve to minimize contamination during particle synthesis. Examples of RF plasma techniques include spray-inductively couple plasma synthesis (SICP) [9, 10], suspension plasma spraying (SPS, see U.S. Pat. Nos. 5,609,921 and 6,994,837, and U.S. Patent Publication No. 2007/0029291), and precursor plasma spraying (PPS) [7]. These techniques are useful in the synthesis of various metal, ceramic and semiconductor powders.

In the SICP process, particles of various materials are produced using a RF plasma by feeding pre-atomized solution/suspension droplets into the plasma region via a thin cooled probe inserted directly into the plasma [10, 11]. Since the probe diameter is severely constricted (less than about ¹⁄₁₀ of the diameter of the central core region of the plasma torch), the probability for the pre-atomized droplets to coalesce and form larger droplets is high. This can lead to the formation of large particles along with smaller ones, which not only broadens the particle size distribution, but also increases the total number of the particles having larger diameters.

The SPS (and the similar PPS) process for producing films or particles takes advantage of a high-pressure water-cooled two-fluid type probe atomizer that is inserted directly into the plasma torch [12-14]. This atomizer arrangement is not capable of producing small enough droplets. The size range of the droplets produced by the atomizer in the SPS process as stated in the specifications from manufacturer is 20-120 μm or larger depending on operating conditions. Furthermore, the arrangement of having the probe inserted directly into the plasma makes it impossible to attach a scavenging mechanism for removing large droplets. As a result, particles with a wide size range ranging from a few tens of nanometers to larger than 10 μm are produced. This is easily appreciated by perusing the size distribution data provided in references [8] and [14]. Although the current state-of-the-art RF plasma-based techniques can produce particles in the sub-100 nm range of diameters, they are inherently incapable of producing a plurality of nanoparticles with a majority of the volume concentrated in sub-100 nm particles. From the point of view of industrial production, it is important to have the ability to produce a large volume fraction carried by sub-100 nm particles. A large fraction of the mass of particles produced by current industrial processes now would have diameters larger than 100 nm, which would have to be rejected in nanoparticle production.

Various embodiments described herein address the need for a technique to successfully control the particle size distribution below the 100 nm threshold by using RF plasma processing of atomized solvent/suspension precursors. Furthermore, this technique can also be applied to other processes like flame spray synthesis, combustion synthesis or any system where an aerosolized form of the precursor needs to be injected into a reaction zone for particle synthesis.

SUMMARY

An embodiment provides a method of generating nanoparticles comprising forming a plurality of nebulized droplets and feeding said plurality of nebulized droplets into a radio frequency plasma torch to generate a plurality of nanoparticles having a total volume, wherein more than 50% of the total volume is contributed by particles having diameters less than 50 nm. In some embodiments, forming the plurality of nebulized droplets comprises nebulizing a liquid precursor.

Another embodiment provides a method of feeding nebulized droplets into a radio frequency (RF) plasma torch comprising feeding a central gas axially into a central region of the RF plasma torch, and replacing at least a portion of the central feed gas with an aerosol stream comprising the nebulized droplets. In one embodiment, the central feed gas is gradually replaced by the aerosol stream.

Another embodiment provides an apparatus for generating nanoparticles comprising a plasma torch comprising an extended gas injector leading to a central region having a central region diameter, a central gas line axially coupled to the extended gas injector, and a nebulizer having a wide feed aerosol outlet coupled to the central gas line. In some embodiments, the wide feed aerosol outlet has an aerosol outlet diameter that is substantially the same as the central region diameter.

DETAILED DESCRIPTION OF THE PREFERRED EMBODIMENTS

One of many approaches to generate nano-sized particles with a majority of the population having diameters under 100 nm is to change the physical property of the nanoparticle precursor. By decreasing the sizes of the droplets that are fed into the radio frequency (RF) plasma torch, a large percentage of the nanoparticles produced may be within the targeted particle sizes. The use of small nebulized precursor droplets permits better control over nanoparticle production in the 5-50 nm size range, and therefore reduces unwanted large particle formation. Various embodiments described herein relate to a novel method and apparatus for generating nanoparticles with small mean particle sizes by using a plasma reactor coupled with a nebulizer or nebulization device. The connection between the nebulization device and the plasma torch allows droplets with a small mass median diameter (MMD) to enter the plasma torch.

Some embodiments involve a novel probe-less integration scheme of connecting a suitable atomization device capable of aerosolizing a precursor solution or suspension and a modified RF plasma torch for the production of nanoparticles (<100 nm diameter).

In some embodiments, a majority or over 50% of the total volume of a generated nanoparticle population is contributed or carried by nanoparticles having particle sizes (i.e., diameters of the particles) under about 200 nm, under about 100 nm, under about 50 nm, or under about 20 nm. The nanoparticle population may be generated by introducing a plurality of nebulized droplets with a small MMD into a RF plasma. The MMD is the diameter of a particle having the median mass of all the particles in a population. In one embodiment, the use of nebulized droplets with a MMD of less than 2 μm may result in more than 70% of the total volume of all the particles produced being contributed by particles with diameters less than about 50 nm. In some embodiments, more than 70% of the total volume of the plurality of nanoparticles produced may be contributed by particles with diameters between about 1 and about 200 nm, between about 1 and about 100 nm, between about 1 and about 50 nm, or between about 1 to about 20 nm. In some embodiments, over about 60%, about 70%, about 80% or about 90% of the total volume of all the nanoparticles may be contributed by particles with diameters between about 1 and about 200 nm, between about 1 or about 100 nm, between about 1 to about 50 nm, or between about 1 to about 20 nm. In some embodiments, more than about 60%, about 70%, about 80%, about 90% or about 99.9% by number of the particles produced are smaller than about 50 nm in diameter.

Apparatus

Figure 1:
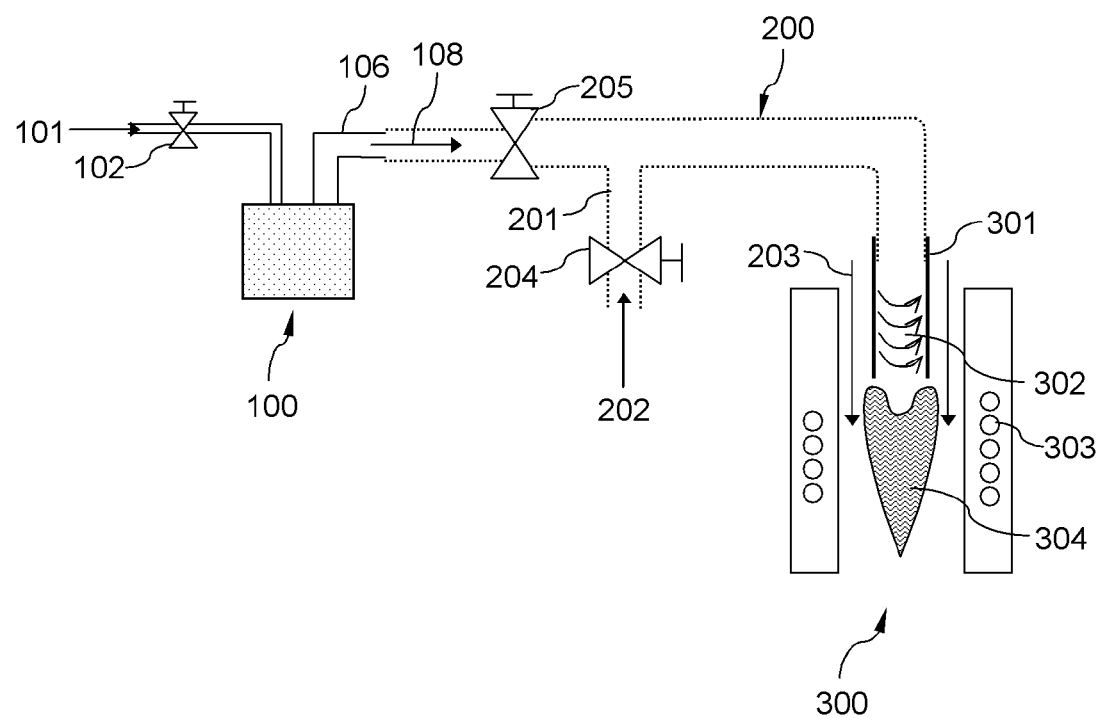
FIG. 1 shows a schematic of a connection scheme for delivering nebulized droplets to a plasma reactor.

With reference to FIG. 1, an embodiment provides an apparatus for generating or forming a plurality of nanoparticles comprising a plasma reactor coupled to a nebulizer. The plasma reactor comprises a plasma torch 300, and the plasma torch 300 is coupled to a nebulizer 100 through the central gas line 200. In some embodiments, the plasma torch 300 comprises an extended gas injector 301 that leads to a central region 302 of the plasma torch 300.

In some embodiments, the nebulizer 100 is used to form a plurality of precursor droplets. A nebulizer is a device that is capable of converting a bulk liquid precursor into a spray or a mist of droplets. In some embodiments, the nebulizer also comprises a scavenging mechanism (not shown) to eliminate larger droplets while allowing smaller droplets to go forward in a spray or mist stream. In some embodiments, the scavenging mechanism eliminates larger droplets by impacting the spray or the mist onto a surface (e.g., the inside wall of the nebulizer) or a screen, and thereby generating a plurality of nebulized precursor droplets or an aerosol stream 108. Examples of suitable atomizing and nebulizing devices include, but not limited to, ultrasonic nebulizer, Collison nebulizer, various medical atomizers, commercial smoke-production device, automotive fuel injector, spray-painting device and any other means which produces sufficiently small precursor droplets. In some embodiments, secondary atomization chambers that separate large atomized droplets from standard atomizers like automotive fuel injectors and spray painting equipment can also be used. In some embodiments, an atomizer or an atomizing device that produces larger droplets may also be used to generate the precursor droplets. A scavenging mechanism or device may be put in place after the spray or mist exits the atomizer to stop the larger droplets from going forward into the aerosol stream 108 that comprises nebulized precursor droplets. In some embodiments, the nebulized precursor droplets in the aerosol stream may have a MMD between about 0.5 μm and about 10 μm, or between about 0.1 μm and about 2 μm. In one embodiment, a Collison nebulizer is used to generate an aerosol stream 108 of precursor droplets with a MMD of about 2 μm. The design and the operation of the Collision nebulizer may be found in May, K. R., The Collison Nebulizer: Description, performance and application. Journal of Aerosol Science, 4(3): 235-238 (1973) [15], the disclosure of which is herein incorporated by reference.

The nebulized droplets are carried by an atomizing gas 101 and exit through an aerosol outlet 106 that has a wide feed or opening. In some embodiments, the wide feed or opening of the aerosol outlet 106 matches the diameter of the central gas injector 301. Examples of suitable atomizing gases 101 include argon, helium, nitrogen, air or any other gas (or mixture thereof) which does not result in any significant negative effect on the operation of the nebulizer and does not adversely affect the generation/operation of the RF plasma. In some embodiments, reactive carrier gases like oxygen or methane can be used to further facilitate the reaction of the precursors in the plasma stream.

In some embodiments, the nebulizer 100 is coupled to the plasma torch 300 through the central gas line 200. The wide feed aerosol outlet 106 of the nebulizer 100 has an aerosol outlet diameter that is suitable for direct or indirect connection to the central gas line 200. The central gas line 200 may further comprise a central gas inlet 201, wherein a stream of central gas may be introduced into the central gas line 200 by itself or to be mixed with the aerosol stream 108 comprising the atomizing gas 101 and nebulized droplets from the nebulizer 100.

In some embodiments, the plasma reactor comprises an extended gas injector 301, which leads to the central region 302 of the plasma torch 300. The diameter of the extended gas injector 301 may be substantially the same as the diameter of the central region 302 of the plasma torch 300. In an embodiment, the extended gas injector 301 may be positioned to introduce the aerosol stream 108 axially into the plasma torch 300. In another embodiment, the extended gas injector 301 may be positioned to introduce aerosol stream 108 tangentially into the plasma torch 300. The axial direction is along the plasma torch axis, while the tangential direction is along the path of the swirl on a plane perpendicular to the axial direction. The central gas line 200 is connected or coupled to the extended gas injector 301. In some embodiments, the diameter of the central gas line 200 may be substantially the same as that of the extended gas injector 301. In some embodiments, the extended gas injector 301 is capable of feeding a plurality of nebulized droplets without increasing MMD of the nebulized droplets by more than about 10%, more than about 5%, or more than about 1%.

Using an aerosol outlet 106 with an inner diameter that is substantially the same as the inner diameter of the central region 302 of the plasma torch 300, and in some embodiments, also substantially the same as the inner diameter of the central gas line 200, allows the aerosol stream 108 to enter the plasma torch 300 without being constricted and thus is substantially free of agglomeration of nebulized droplets.

Conventional RF plasma torch technologies often use a probe type atomizer which is inserted into the RF plasma torch. The atomized droplet formation takes place inside the plasma torch or in the plasma discharge itself. This leads to the incorporation of large droplets (for example, 20-120 μm) into the aerosol stream, which results in the generation of large particles. The probe type atomizer has no inherent mechanism for large droplet scavenging. In the case of probe type feeding of remotely-atomized/nebulized precursors, the probe has an aerosol outlet diameter on the order of 1/10 of the size of the central feed region. Hence the aerosol stream must travel through the small aerosol outlet significantly enhancing the possibility of coalescence of droplets into larger droplets. These above-mentioned drawbacks limit the ability to control the particle size synthesized in the plasma in the nano size range when using either of the two arrangements. As a result, the particles formed from the probe-type plasma reactor have a significantly larger fraction of the volume carried by particles larger than 1 μm due to the larger MMD of precursor droplets.

Method

One embodiment provides a method of generating or making a plurality of nanoparticles by using a plasma reactor coupled to an nebulizer, wherein over about 50% of the total volume of all the nanoparticles is contributed by particles having diameters between about 1 and about 200 nm, between 1 or about 100 nm, between about 1 to about 50 nm, or between about 1 to about 20 nm. In some embodiments, over about 60%, about 70%, about 80%, about 90% or about 99.9% of the total volume of all the nanoparticles is carried by or made out of particles having diameters between about 1 and about 200 nm, between 1 or about 100 nm, between about 1 to about 50 nm, or between about 1 to about 20 nm. In some embodiments, more than about 60%, about 70%, about 80%, about 90% or about 99.9% by number of the particles produced are smaller than about 50 nm in diameter.

In an embodiment, a method comprises forming a plurality of nebulized droplets and feeding the plurality of nebulized droplets into a radio frequency (RF) plasma torch to generate nanoparticles. The nebulized droplets may be produced using any of the nebulizers mentioned herein or any device capable of forming a mist or a spray. In some embodiments, the nebulized droplets exit the nebulizer as an aerosol stream 108 through an aerosol outlet 106 with an enlarged exit diameter, and may be fed into the plasma torch 300 through the central gas line 200.

In some embodiments, the central gas line may feed the central gas 202 into the plasma torch 300. The central gas 202 may or may not be the same as the atomizing gas 101. In some embodiments, the nebulized droplets may be introduced or fed into the plasma torch 300 using the same gas as the central gas 202 for the plasma torch. An example of this dual purpose gas is Argon. In some embodiments, the aerosol stream 108 may gradually replace the central gas 202 when entering the plasma torch 300. In some embodiments, the aerosol stream 108 may substantially replace the central gas. In other embodiments, various ratios of the aerosol stream 108 and the central gas 202 may be mixed in the central gas line 200 prior to entering or being fed into the plasma torch 300.

Figure 2A:
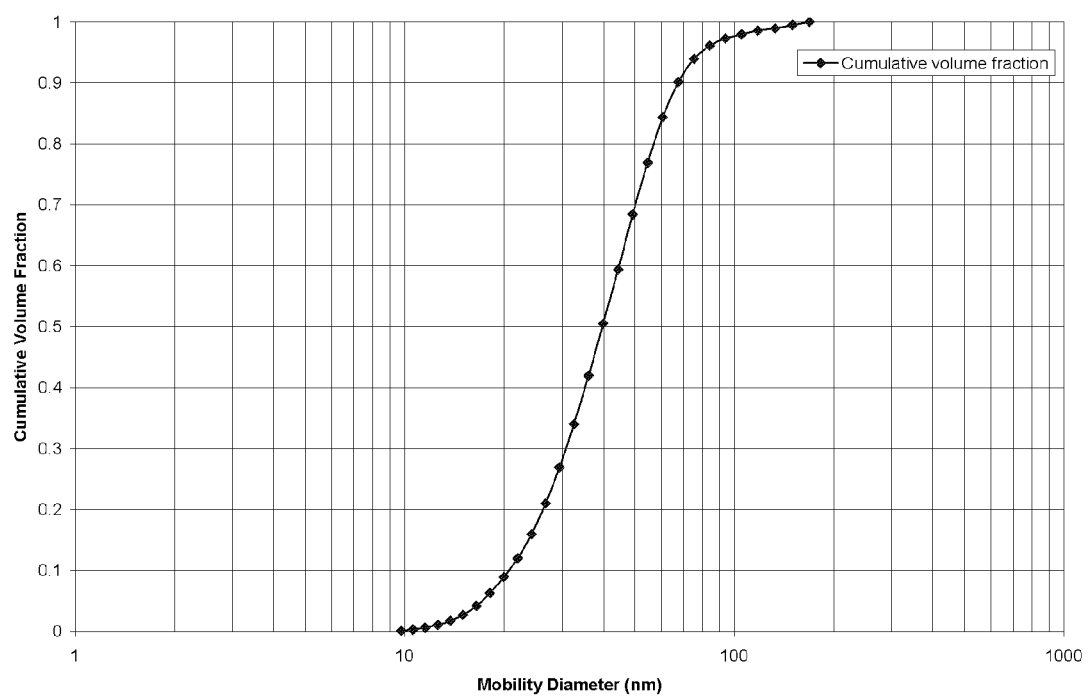
FIG. 2A shows the cumulative volume distribution of yttrium aluminum perovskite (YAP) nanoparticles produced in the plasma using nebulized precursor droplets ($Y(NO_3)_3$+$Al(NO_3)_3$ in MeOH) from a Collison nebulizer.
Figure 2B:
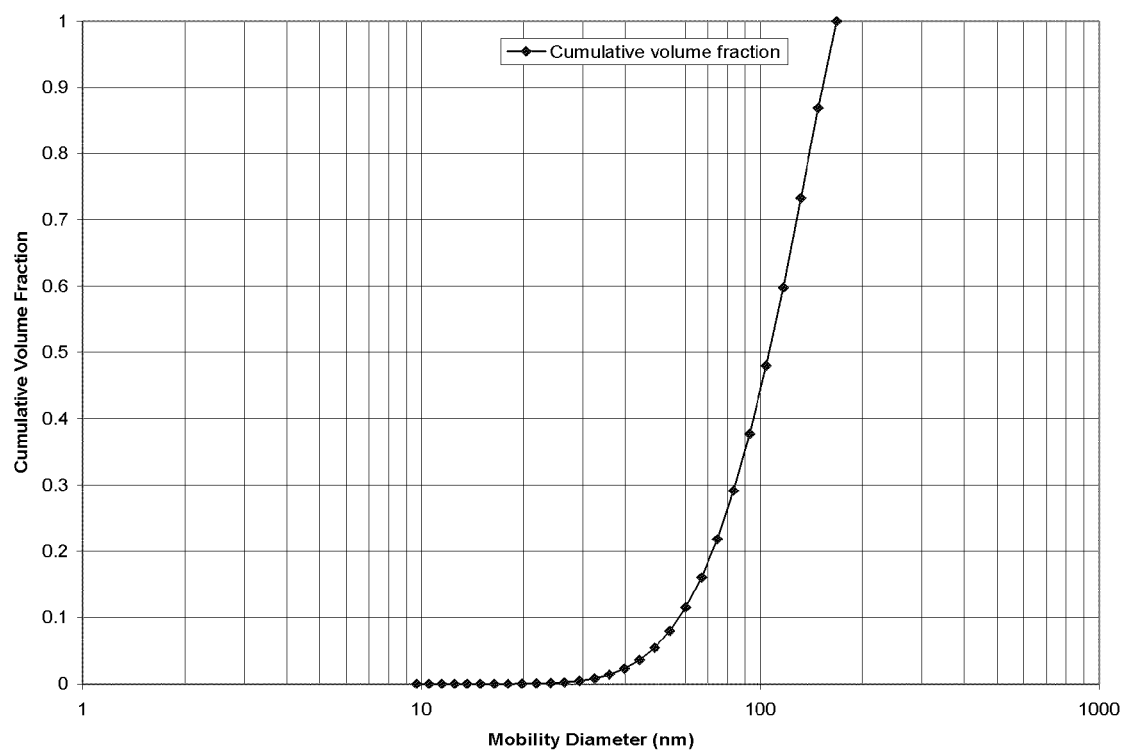
FIG. 2B shows the cumulative volume distribution of YAP nanoparticles produced in the plasma using a probe type atomizer inserted into the plasma using the same precursors ($Y(NO_3)_3$+$Al(NO_3)_3$ in MeOH).

As shown in FIG. 2A, the nanoparticles produced using the exemplified embodiments exhibit have sizes such that more than about 50% of the total volume is contributed or carried by particles with sizes less than about 50 nm. In some embodiments, more than about 60% of the total volume is contributed by particles with sizes less than about 50 nm. In some embodiments more than about 70% of the total volume is contributed by particles with sizes less than about 50 nm. In one embodiment, more than about 73% of the total volume is contributed by particles with sizes less than about 50 nm. In comparison, particles produced using conventional probe type atomization or atomized droplet delivery shows less than 10% of the total volume being contributed by particles with sizes less than about 50 nm, as seen in FIG. 2B.

Figure 3A:
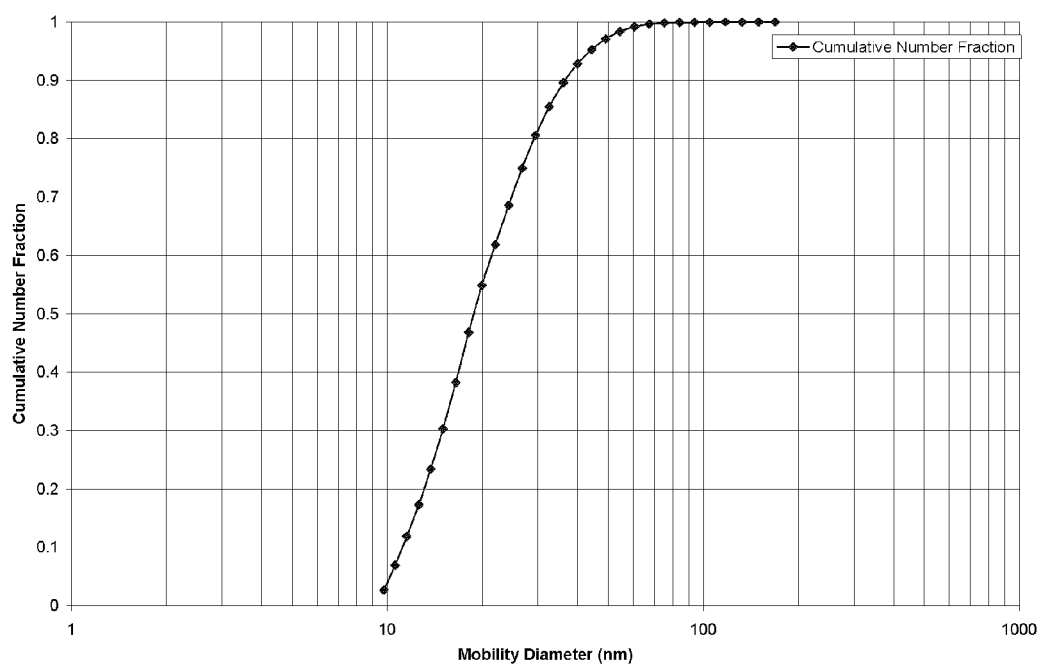
FIG. 3A shows the cumulative number distribution of nanoparticles produced in the plasma using nebulized precursor droplets ($Y(NO_3)_3$+$Al(NO_3)_3$ in MeOH) from a Collison nebulizer.
Figure 3B:
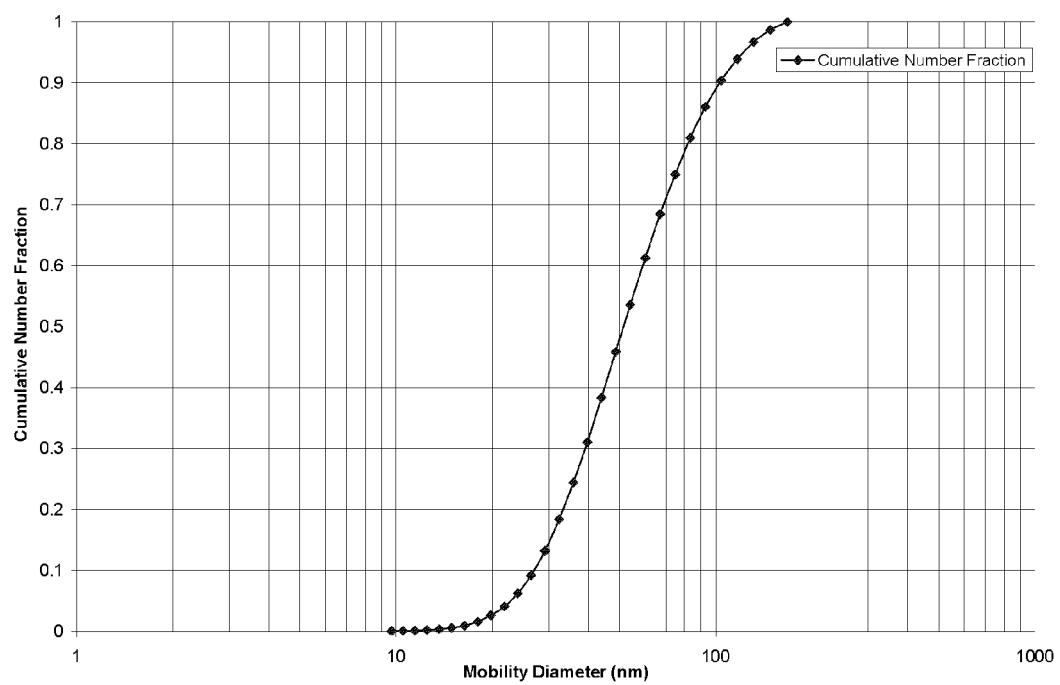
FIG. 3B shows the cumulative number distribution of nanoparticles produced in the plasma using a probe type atomizer inserted into the plasma using the same precursor ($Y(NO_3)_3$+$Al(NO_3)_3$ in MeOH) as in FIG. 3A.

FIG. 3A is a plot that shows the cumulative number distribution of nanoparticles produced in one embodiment of the present disclosure. The plot shows that more than about 97% of the nanoparticles by number are smaller than about 50 nm. In comparison, FIG. 3B shows the cumulative number distribution of nanoparticles produced in the plasma using a probe type atomizer inserted into the plasma, wherein less than 50% of the nanoparticles by number have a particle size of less than 50 nm.

Figure 4A:
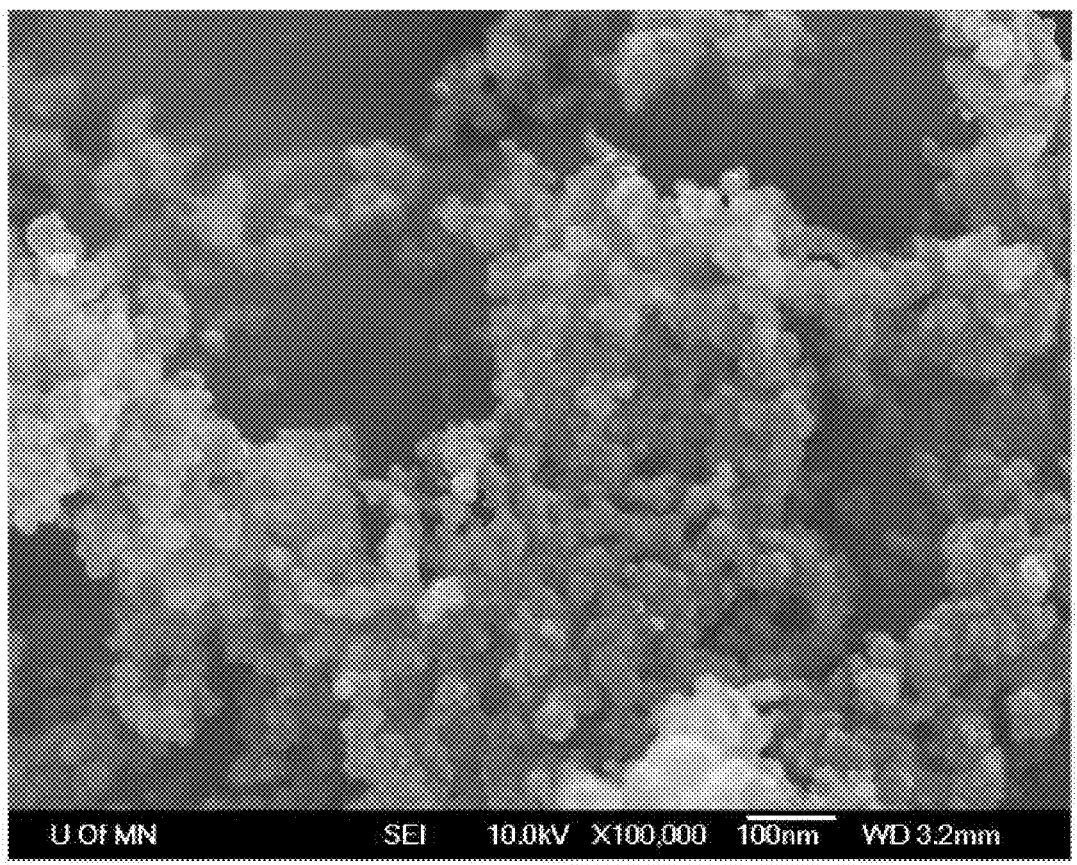
FIG. 4A shows a scanning electron micrograph of YAP nanoparticles synthesized using a Collison nebulizer interfaced with a RF plasma torch.
Figure 4B:
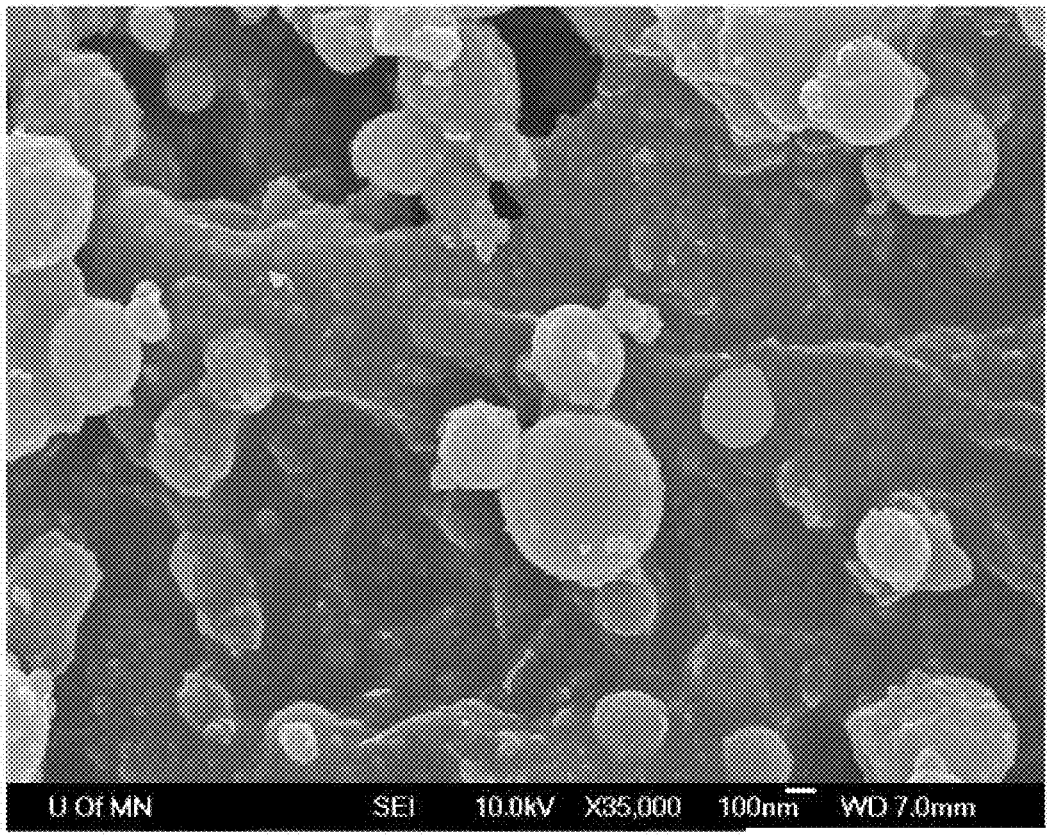
FIG. 4B shows a scanning electron micrograph of YAP particles generated using a two-fluid atomizer probe.

Examples of the smaller particle sizes of the nanoparticles produced using the apparatus and methods described herein can also be seen in the scanning electron microscope (SEM) photomicrograph shown in FIG. 4A. When compared to an SEM photomicrograph of a sample produced by a conventional probe atomization as shown in FIG. 4B, a significantly smaller number of particles with larger particle sizes are produced using the exemplified embodiment.

Particles much larger than 200 nm were produced using the conventional probe atomization method, while no or very few particles larger than 200 nm were observed in the sample synthesized using the apparatus and methods described herein. Since the particle measurement setup used to analyze these samples was designed to measure particles up to 180 nm in diameter, particles larger than 180 nm were not taken into account when the cumulative volume distribution curve (FIG. 2B) and the cumulative number distribution curve (FIG. 3B) were generated. This means that in the case of particles generated using conventional probe atomization, the total contribution from the sub-50 nm particles in the cumulative volume distribution and the cumulative number distribution would have been lower if all particles were counted. On the other hand, no adjustment or change would be needed in the cumulative volume distribution and cumulative number distribution curves (FIGS. 2A and 3A, respectively) of the sample produced using apparatus and method described herein, because no or very few particles over 180 nm in diameter were produced.

Another embodiment provides a novel method of feeding the nebulized droplets or the aerosol stream 108 into the plasma torch 300. The central gas 202 for an RF plasma torch 300 is usually fed into the center of the torch with or without a swirl and is introduced tangentially. In some embodiments, the central feed gas is fed axially into the central region 302 of the plasma torch 300 (see FIG. 1). In some embodiments, the axially fed central gas 202 is gradually replaced by the aerosol stream 108 comprising a plurality of nebulized droplets and the atomizing gas 101 (i.e., aerosol generator gas or carrier gas) in the central gas line 200. The atomizing gas 101 may or may not be the same as the axially fed central gas 202. In one embodiment, the nebulized droplets are fed by replacing at least a portion of the central gas 202 with the aerosol stream 108.

In some embodiments, nanoparticles of YAP (yttrium aluminum perovskite) or $Ce^{3+}$-doped YAP may be synthesized using any of the disclosed methods and/or apparatus.

EXAMPLE

The YAP (yttrium aluminum perovskite) nanoparticles were synthesized using Collison nebulizer-RF plasma torch apparatus. Precursor solution (0.4 M) was formed by dissolving yttrium nitrate and aluminum nitrate in isopropyl alcohol (IPA) in a 3:5 molar ratio to emulate the atomic ratio of Y:Al in yttrium aluminum garnet (YAG, $Y_3Al_5O_{12}$). The plasma chamber was evacuated to ~25 torr, and the sheath argon (~30-35 slm) was introduced axially by the normal pathway (as built by standard manufacturer) into the plasma torch. Details of the construction of the RF plasma torch are described in U.S. Pat. No. 5,200,595. The central gas (argon, 10-20 slm) was then introduced axially into the plasma torch. This central argon could also be introduced by a combination of the axial flow and the swirl path built into the gas injector. When using the later approach, the axial argon flowing could be partially replaced by air, and the plasma central gas would be composed of a mixture of argon and air. The plasma was ignited at around 60-100 torr chamber pressure with a plate power of ~10-12 kW. The pressure in the chamber was gradually elevated to 650-700 torr, which should not be considered as a necessity for operation of the claimed system. Adjustments to the plasma power level to sustain the plasma were made as needed. Typically, 16-25 kW plate power was used in the example experiments which should not be considered as limitation for operation of the claimed system.

A valve 204 (see FIG. 1) was gradually closed while the atomizing gas (argon or air or any other suitable gas or a mixture thereof) was gradually introduced into the Collison nebulizer to maintain a constant flow rate of central gas. A valve 205 was opened in synchronization with the closure of the valve 204. According to manufacturer's specifications, the maximum precursor delivery rate was calculated to be about 1 ml/min. Thus the plasma central gas was replaced by a nebulized droplet-laden gas stream. The nebulized droplets underwent evaporation of components followed by dissociation of precursor compounds. Particles nucleated following particle nucleation and growth in thermal plasmas [16]. No quenching gas was used although that is not necessarily a condition for successfully running the system. Production runs were as long as 60 minutes, and the production rates could go as high 1 mg/min with the setup used in this example.

The $Ce^{3+}$-doped YAP nanoparticles were synthesized using the same method, except about 1% (molar) of the yttrium nitrate was replaced by cerium nitrate.

All references cited herein are expressly incorporated by reference in their entirety.

REFERENCES

1. Mueller, R., Madler, L., and Pratsinis, S. E., *Nanoparticle synthesis at high production rates by flame spray pyrolysis*. Chemical Engineering Science, 58(10): 1969-1976 (2003).
2. Maric, R., Oljaca, M., Vukasinovic, B., and Hunt, A. T., *Synthesis of Oxide Nanopowders in NanoSpray$^{SM}$ Diffusion Flames*. Materials & Manufacturing Processes, 19(6): 1143-1156 (2004).
3. Leparoux, M., Schreuders, C., Shin, J. W., and Siegmann, S., *Induction Plasma Synthesis of Carbide Nano-Powders*. Advanced Engineering Materials, 7(5): 349-353 (2005).
4. Bouyer, E., Gitzhofer, F., and Boulos, M. I., *Suspension plasma spraying for hydroxyapatite powder preparation by RF Plasma*. IEEE Transactions on Plasma Science 25(5): 1066-1072 (1997).
5. Schiller, G., Müller, M., and Gitzhofer, F., *Preparation of perovskite powders and coatings by radio frequency suspension plasma spraying*. Journal of Thermal Spray Technology, 8(3): 389-392 (1999).
6. Fauchais, P., Etchart-Salas, R., Delbos, C., Tognonvi, M., Rat, V., Coudert, J. F., and Chartier, T., *Suspension and solution plasma spraying of finely structured layers: potential application to SOFCs*. Journal of Physics D: Applied Physics, 40(8): 2394-2406 (2007).
7. Parukuttyamma, S. D., Margolis, J., Liu, H., Grey, C. P., Sampath, S., Herman, H., and Parise, J. B., *Yttrium Aluminum Garnet (YAG) Films through a Precursor Plasma Spraying Technique*. Journal of the American Ceramic Society, 84(8): 1906-1908 (2001).
8. Castillo, I. A. and Munz, R. J., *Inductively Coupled Plasma Synthesis of $CeO_2$-based Powders from Liquid Solutions for SOFC Electrolytes*. Plasma Chemistry and Plasma Processing, 25(2): 87-107 (2005).
9. Mizoguchi, Y., Kagawa, M., Syono, Y., and Hirai, T., *Deposition of $TiO_2$ on heated substrates by the spray-inductively-coupled-plasma technique*. Journal of Materials Science Letters, 12(23): 1854-1855 (1993).
10. Lau, Y.-C. and Pfender, E., *Deposition of Superconducting Thick Films by Spray Inductively Coupled Plasma Method*, Regents of the University of Minnesota, Minneapolis, Minn., (1991), USA patent U.S. Pat. No. 5,032,568.
11. Kagawa, M., Suzuki, M., Mizoguchi, Y., Hirai, T., and Syono, Y., *Gas-phase synthesis of ultrafine particles and thin films of Y-Al-O by the spray-ICP technique.* Journal of Aerosol Science, 24(3): 349-355 (1993).
12. Gitzhofer, F., Bouyer, E., and Boulos, M. I., *Suspension Plasma Spray*, University of Sherbrooke, Sherbrooke, Canada, (1997), USA patent U.S. Pat. No. 5,609,921.
13. Boulos, M. I., Jurewicz, J. W., and Nessim, C. A. A. M., *Plasma synthesis of metal oxide nanopowder and apparatus thereof*, Tekna Plasma Systems Inc, Quebec, Canada, (2006), USA patent U.S. Pat. No. 6,994,837 B2.
14. Boulos, M. I., Jurewicz, J., and Guo, J., *Induction plasma synthesis of nanopowders,* Tekna Plasms Systems Inc, Sherbrooke, Canada, (2007), USA patent US 2007/0029291 A1.
15. May, K. R., *The collison nebulizer: Description, performance and application.* Journal of Aerosol Science, 4(3): 235-238 (1973).
16. Girshick, S. L., *Particle nucleation and growth in thermal plasmas*. Plasma Sources Science and Technology, 3: 288-394 (1994).

What is claimed is:

1. A method of generating nanoparticles comprising:

providing an atomizing gas;

forming a plurality of atomized droplets in said atomizing gas;

scavenging at least a portion of the plurality of atomized droplets in said atomizing gas to obtain a plurality of nebulized droplets, wherein the plurality of nebulized droplets have a reduced average size relative to the plurality of atomized droplets, and feeding said plurality of nebulized droplets into a radio frequency (RF) plasma torch to generate a plurality of nanoparticles having a total volume, wherein more than 50% of said total volume is contributed by nanoparticles having diameters less than 50 nm, and
wherein said plurality of nebulized droplets are obtained remotely relative to the RF plasma torch.

2. The method of claim 1, wherein more than 60% of said total volume is contributed by the nanoparticles with diameters less than 50 nm.

3. The method of claim 1, wherein more than 70% of said total volume is contributed by the nanoparticles with diameters less than 50 nm.

4. The method of claim 1, wherein the plurality of nebulized droplets have a mass median diameter (MMD) of between about 0.1 μm and about 2 μm.

5. The method of claim 1, wherein at least obtaining the plurality of nebulized droplets is performed using a device selected from the group consisting of a Collison nebulizer and an ultrasonic nebulizer.

6. The method of claim 1, wherein the nanoparticles comprise yttrium aluminum perovskite (YAP).

7. The method of claim 1, wherein the nanoparticles comprise cerium-doped yttrium aluminum perovskite (YAP).

8. The method of claim 1, further comprising feeding the plurality of nebulized droplets in the aerosol stream through a channel connected to an extended gas injector of the RF plasma torch, wherein the channel has a diameter that is about the same as a diameter of the extended gas injector.

9. The method of claim 8, further comprising feeding the plurality of nebulized droplets through the extended gas injector and axially feeding the plurality of nebulized droplets into a central region of the RF plasma torch.

10. A method of feeding nebulized droplets into a radio frequency (RF) plasma torch comprising:
feeding a central gas axially into a central region of the RF plasma torch; and
replacing substantially all of the central gas with an aerosol stream comprising a plurality of nebulized droplets, wherein the aerosol stream is fed axially into the central region of the RF plasma torch.

11. The method of claim 10, wherein the plurality of nebulized droplets has a mass median diameter (MMD) of between about 0.1 μm and about 2 μm.

12. The method of claim 11, wherein the MMD increases by less than about 10% during said replacing.

13. The method of claim 10, wherein the plurality of nebulized droplets are generated using a Collison nebulizer.

14. The method of claim 10, wherein the aerosol stream further comprises an atomizing gas selected from the group consisting of argon, helium, nitrogen and air.

15. The method of claim 14, wherein the central gas is the same as the atomizing gas.

16. The method of claim 10, wherein the central gas is gradually replaced by the aerosol stream.

17. The method of claim 10, wherein a flow rate into the central region of the RF plasma torch is about the same after replacing the central gas with the aerosol stream.

18. The method of claim 17, wherein the flow rate into the central region of the RF plasma torch is generally constant while replacing the central gas with the aerosol stream.

* * * * *

UNITED STATES PATENT AND TRADEMARK OFFICE
CERTIFICATE OF CORRECTION

| | | |
|---|---|---|
| PATENT NO. | : 8,029,595 B2 | Page 1 of 1 |
| APPLICATION NO. | : 12/131844 | |
| DATED | : October 4, 2011 | |
| INVENTOR(S) | : Rajesh Mukherjee et al. | |

It is certified that error appears in the above-identified patent and that said Letters Patent is hereby corrected as shown below:

In column 1 (Title page 2 item 56) at line 53, Under Other Publications, change "Hydroxyaptite" to --Hydroxyapatite--.

In column 1 (Title page 2 item 56) at line 55, Under Other Publications, change "GPreparation" to --Preparation--.

In column 2 (Title page 2 item 56) at line 46, Under Other Publications, change "Furnce" to --Furnace--.

In column 8 at line 46, Change "Plasms" to --Plasma--.

In column 8 at line 64, In Claim 1, change "droplets," to --droplets;--.

Signed and Sealed this
First Day of January, 2013

David J. Kappos
*Director of the United States Patent and Trademark Office*